United States Patent
Ulichney et al.

(10) Patent No.: US 11,030,502 B2
(45) Date of Patent: Jun. 8, 2021

(54) OMNIDIRECTIONAL BARCODE

(71) Applicant: HEWLETT-PACKARD DEVELOPMENT COMPANY, L.P., Houston, TX (US)

(72) Inventors: Robert Ulichney, Stow, MA (US); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 288 days.

(21) Appl. No.: 16/082,742

(22) PCT Filed: Feb. 6, 2017

(86) PCT No.: PCT/US2017/013711
§ 371 (c)(1),
(2) Date: Sep. 6, 2018

(87) PCT Pub. No.: WO2018/136027
PCT Pub. Date: Jul. 26, 2018

(65) Prior Publication Data
US 2020/0302254 A1    Sep. 24, 2020

(51) Int. Cl.
*G06K 19/06*   (2006.01)
(52) U.S. Cl.
CPC . *G06K 19/06168* (2013.01); *G06K 19/06028* (2013.01)
(58) Field of Classification Search
CPC ................................................ G06K 19/06168
USPC .................................................. 235/494, 375
See application file for complete search history.

(56) References Cited

U.S. PATENT DOCUMENTS

| 7,766,641 | B2 | 8/2010 | Silverbrook | |
|---|---|---|---|---|
| 9,355,344 | B2 * | 5/2016 | Slavin | G06K 7/1095 |
| 2009/0110325 | A1 * | 4/2009 | Smith | G06K 7/10762 382/275 |
| 2011/0221846 | A1 * | 9/2011 | Smith | G06K 1/121 347/107 |
| 2013/0233914 | A1 * | 9/2013 | Lillard, Jr. | B65D 1/265 235/375 |

(Continued)

FOREIGN PATENT DOCUMENTS

| CN | 105034365 A | 11/2015 |
|---|---|---|
| CN | 105094088 A | 11/2015 |

(Continued)

OTHER PUBLICATIONS

Halterman, "Volvo Trucks Cuts Production Time by 94% & Costs with Stratasys 3D Printing Systems", 3DPrint.com, Retrieved from internet—https://3dprint.com/52007/volvo-trucks-3d-print-parts/, 2016, 7 Pages.

*Primary Examiner* — Allyson N Trail
(74) *Attorney, Agent, or Firm* — Fabian VanCott

(57) ABSTRACT

An omnidirectional barcode may include a graphical representation of a one-dimensional barcode wherein the graphical representation of the one-dimensional barcode is extended circumferentially around a three-dimensional (3D) object. A method of forming an omnidirectional barcode may include creating a graphical representation of a one-dimensional barcode and extending the one-dimensional representation in at least one dimension.

19 Claims, 7 Drawing Sheets

(56) References Cited

U.S. PATENT DOCUMENTS

| | | |
|---|---|---|
| 2014/0201260 A1* | 7/2014 | Dor ........................ H01R 13/64 |
| | | 709/203 |
| 2014/0214684 A1 | 7/2014 | Pell |
| 2014/0247278 A1 | 9/2014 | Samara et al. |
| 2015/0140379 A1* | 5/2015 | Yau .................... H01M 10/4221 |
| | | 429/90 |
| 2015/0145158 A1 | 5/2015 | Levine et al. |
| 2016/0016321 A1 | 1/2016 | Rus et al. |
| 2016/0260001 A1 | 9/2016 | Flores et al. |
| 2017/0046548 A1* | 2/2017 | Kamijo .................. G06K 1/121 |
| 2017/0165779 A1* | 6/2017 | Barhorst ................ B23K 9/095 |
| 2020/0104559 A1* | 4/2020 | Powers .............. G06K 7/10821 |

FOREIGN PATENT DOCUMENTS

| | | |
|---|---|---|
| EP | 0129084 A2 | 12/1984 |
| EP | 2275965 A2 | 1/2011 |

* cited by examiner

OMNIDIRECTIONAL BARCODE

BACKGROUND

Barcodes, with a barcode reader, are used to identify objects or deliver information with which the barcode is coupled or associated. The barcode may include a number of lines and spaces that may be optically detectable by the barcode reader. The lines and spaces may be translated into data based upon a predetermined mapping process.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1A:
FIGS. 1A-1D are diagrams showing process of forming an omnidirectional barcode according to an example of the principles described herein.

As described above, barcodes may be used to identify, via a predetermined mapping of alphanumeric codes to a number of lines and spaces, any good or object to which the barcode is coupled thereto. Often these barcodes are printed on a packaging of the object or good itself at a single location. Indeed, the barcode may be placed on the object at a location where space is not occupied by advertisement images, object descriptions, ingredient listings, or legal disclaimers, among others. As space on the object comes at a premium, the barcode may be made relatively smaller in order to increase the advantages realized by the other uses of the surface of the object.

In the case of one-dimensional (1D) barcodes, as the space for or the size of the 1D barcode is reduced, it may become relatively more difficult to scan the object. This may be true even where a human handles the object to be scanned and may physically orient the object in a proper scanning position such that the 1D barcode may be read. However, where an automated 1D barcode scanner is used to scan a barcode on the object, the object may not be so oriented with relation to the scanner so that the barcode may be scanned. This may result in human intervention in order to allow for proper scanning of the object. This adds additional time to the automated process as well as additional costs associated with having a human present to overcome these deficiencies.

One option to overcome these deficiencies is to place several instances of the 1D barcode at multiple locations on the surface of the object. While this approach may improve the chance of an automated system scanning the object, there may still be gaps between the multiple instances of the 1D barcodes where the scanner may miss any given 1D barcode.

The present specification therefore describes an omnidirectional barcode that includes a graphical representation of a one-dimensional barcode wherein the graphical representation of the one-dimensional barcode is extended circumferentially around a three-dimensional (3D) object.

The present specification further describes a method of forming an omnidirectional barcode that includes creating a graphical representation of a one-dimensional barcode and extending the one-dimensional representation in at least one dimension.

The present specification also describes an object that may include an omnidirectional barcode that includes a graphical representation of a one-dimensional barcode wherein the graphical representation of the one-dimensional barcode is extended circumferentially around a three-dimensional (3D) object.

As used in the present specification and in the appended claims, the term "barcode" is meant to be understood as any optical, machine-readable, representation of data. In an example, the barcode is a one-dimensional (1D) barcode. In an example, the barcode comprises a plurality of bars and spaces, combinations of which map to alphanumeric symbols. In some cases, the arrangement of some of the bars and spaces may be used to enhance the represented data by serving as fiducials that aid in the reading process. In some cases, some subset of the bars and spaces may be used to detect errors that can occur in the reading process. The barcode described herein may be any layout or number of monochromatic or colored bars and spaces that are mapped to a proprietary, open source, or standard encoding definition.

Additionally, as used in the present specification and the appended claims, the term "graphical representation" is meant to be understood as any representation of a rendering of the barcode, such as instructions to draw the code, pixels representing an image of the barcode, mathematical functions describing the barcode, geometric descriptors defining the shape of the code, and the like.

Further, as used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

FIGS. 1A-1D are diagrams showing a process of forming an omnidirectional barcode according to an example of the principles described herein. FIG. 2 is a flowchart showing a method of forming an omnidirectional barcode according to an example of the principles described herein. For ease of description, FIG. 2 will now be described in connection with FIGS. 1A-1D as an example of a process and method of forming the omnidirectional barcode described herein. The method (200) may begin by creating (205) a graphical representation (105) of a one-dimensional barcode (100). In an example, the graphical representation is a one-dimensional representation, such as a one-dimensional component of a raster image representation or a vector image representation. The one-dimensional barcode (100) may be any barcode that may or does appear on an object that is to be labeled with the barcode. As described above, the one-dimensional barcode (100) may include a number of bars (101) and spaces (102) that correspond to an alphanumeric code. The alphanumeric code corresponding to the bars (101) and spaces (102) may be proprietary to the entity creating the alphanumeric code or may be an open source code used generally.

Figure 1B:
Figure 1C:
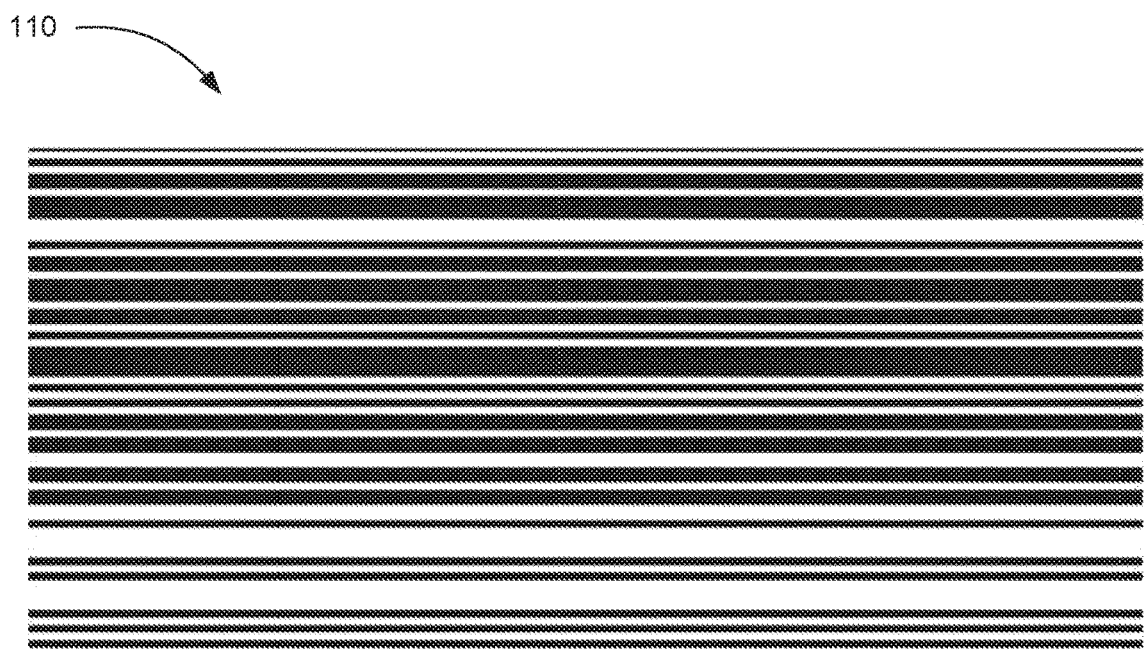
Figure 1D:
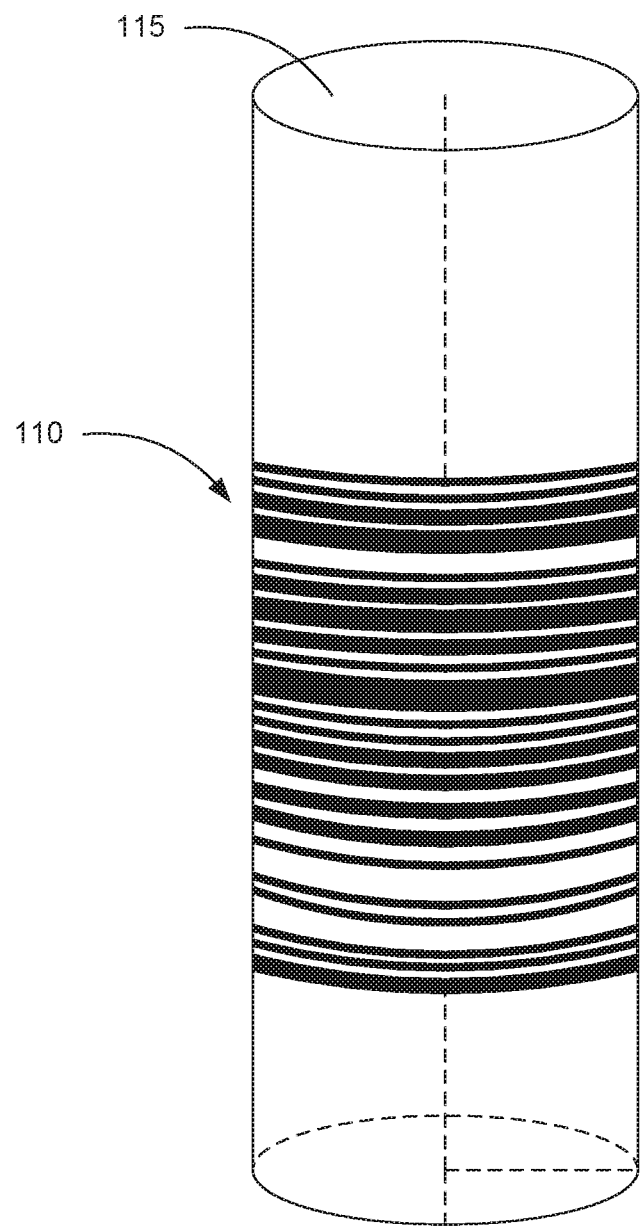
Figure 2:
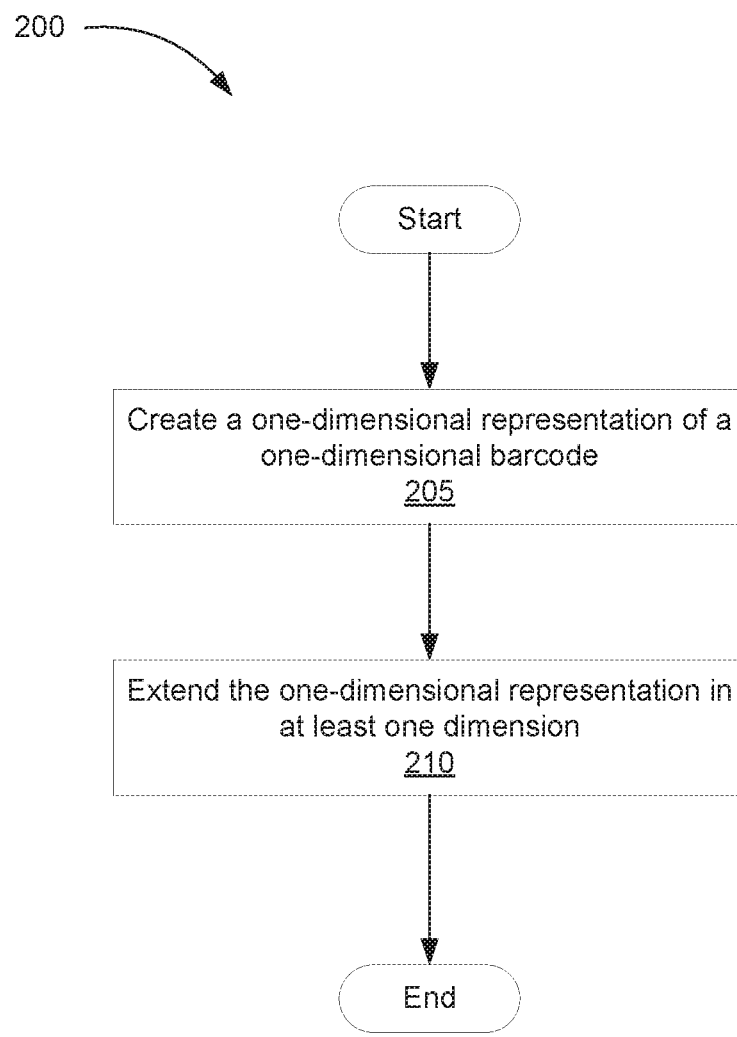
FIG. 2 is a flowchart showing a method of forming an omnidirectional barcode according to an example of the principles described herein.

As merely an example, the one-dimensional barcode (100) depicted in FIG. 1A and manipulated as shown in FIGS. 1B-1D is a European Article Number 8 (EAN-8) barcode. The use of the EAN-8 barcode in these examples is for convenience in description only and is not meant to limit the scope of the present description. Instead, the present description contemplates the use of any one-dimensional barcode in the described methods and structures.

The one-dimensional barcode (100) may include a monochromatic color scheme with a single color such as black against a white background. In this example, the white background forms the spaces (102) between the bars (101) on the one-dimensional barcode (100). In an example, the one-dimensional barcode (100) may be multicolored with each of the number of bars (101) and spaces (102) including a similar or different color. In this example, a barcode scanner may be implemented that is capable of detecting the different colors of the number of bars (101) and spaces (102). With this example, the diversity of the associated alphanumeric code may be relatively larger allowing for more corresponding data to be stored on the one-dimensional barcode (100).

In an example, creating (205) the graphical representation (105) of a one-dimensional barcode (100) may include rendering a single pixel-wide cross-sectional code line (103) from the one-dimensional barcode (100). This operation may be thought of as first rendering the image of the one-dimensional barcode in entirety and selecting a single one-dimensional pixel-wide cross-sectional line from the image of the code. In some examples, a single pixel-wide representation may be rendered from the barcode data directly. Creating a single pixel-wide line allows for many rendering systems based on the creation of pixels to be used. Other systems, however, may use vector descriptors of image data, i.e., drawing instructions, as opposed to values of color associated with size, shape and location.

The code line (103) may include the same scannable data as that of the original one-dimensional barcode (100) without other visible data such as a number system character, an alphanumeric manufacture code, an alphanumeric product code, an alphanumeric country code, an alphanumeric prefix or suffix code, or a check digit, among others. In an example, the fiducials located at the ends and occasionally within the one-dimensional barcode (100) may remain and be reflected in the graphical representation (105) of the one-dimensional barcode (100).

The method (200) may continue with extending (210) the one-dimensional representation in at least one dimension. In this process, in an example with the single pixel-wide cross-sectional code line (103), the single pixel-wide cross-sectional code line (103) may be stretched out to extend each of the bars and spaces of the single pixel-wide cross-sectional code line (103) in a single direction to create a two-dimensional raster representation of bars and spaces across multiple lines of pixels. In this process, in an example with vector image drawing instructions representing the desired barcode, the instructions may be modified to draw the desired one-dimensional shape over a two-dimensional region. This results in an extended one-dimensional representation (110) of the one-dimensional barcode (100) as shown in FIG. 1C that may be wrapped around the perimeter of an object (115) as shown in FIG. 1D. As will be discussed in more detail below, the extended one-dimensional representation (110) of the one-dimensional barcode (100) may be wrapped around any given object such that a barcode scanner may read the barcode regardless of the orientation of the object (115). In the example shown in FIG. 1D, the extended one-dimensional representation (110) of the one-dimensional barcode (100) is wrapped around the entire circumference of a cylinder object (115) such that no gaps are present between a first end of the extended one-dimensional representation (110) of the one-dimensional barcode (100) and a second end of the extended one-dimensional representation (110) of the one-dimensional barcode (100). In an example, the first and second ends of the extended one-dimensional representation (110) of the one-dimensional barcode (100) may be matched such that each of the bars (101) and spaces (102) match up. In an example, the first and second ends of the extended one-dimensional representation (110) of the one-dimensional barcode (100) are not matched up but, instead, the ends of the extended one-dimensional representation (110) of the one-dimensional barcode (100) are positioned above or below each other such that the circumference is completely covered by the extended one-dimensional representation (110) of the one-dimensional barcode (100). Additionally, in an example, the number of bars (101) and spaces (102) in the extended one-dimensional representation (110) of the one-dimensional barcode (100) may be parallel to each other as well as parallel to a common plane. In the example of the cylinder object (115) depicted in FIG. 1D, the common plane may be a base or top of the cylinder object (115). In yet another example, the relative sizes of the bars (101) and spaces (102) in the extended one-dimensional representation (110) of the one-dimensional barcode (100) may be non-uniform across the extended dimension.

Figure 3A:
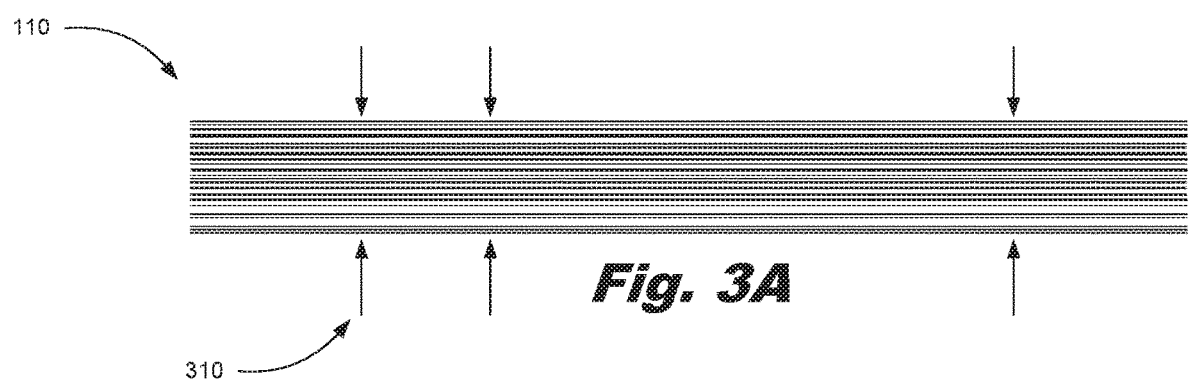
FIGS. 3A and 3B are diagrams showing an example of placement of the omnidirectional barcode of FIG. 1 according to an example of the principles described herein.
Figure 3B:
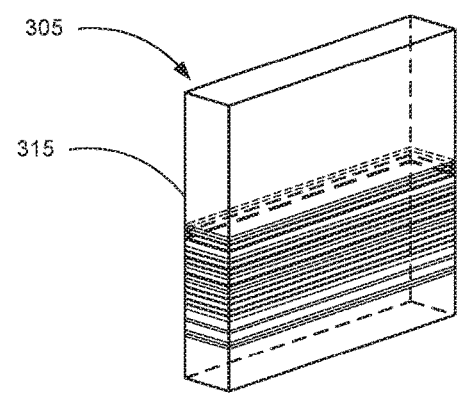

FIGS. 3A and 3B are diagrams showing an example of placement of the omnidirectional barcode of FIG. 1 according to an example of the principles described herein. In this example, the extended one-dimensional representation (110) of the one-dimensional barcode (100) may be wrapped around a cuboid object (305). In an example, the extended one-dimensional representation (110) of the one-dimensional barcode (100) may be printed using a printing device in preparation for application to the surface of the object (115, 305). In this example, a user may indicate the dimensions of the object on which the extended one-dimensional representation (110) of the one-dimensional barcode (100) will be applied. In the case of the cuboid object (305) being selected, the specific dimensions of the cuboid object (305) may be input into a computing device or the printing device prior to printing. During printing, the printing device may indicate via a number of fold indicators (310) where the extended one-dimensional representation (110) of the one-dimensional barcode (100) is to be bent around corners (315) of the cuboid object (305). This may allow a user to better bend the extended one-dimensional representation (110) of the one-dimensional barcode (100) around the cuboid object (305) or any other object (115, 305) having corners (315) or edges. FIG. 3B shows this wrapping of the extended one-dimensional representation (110) of the one-dimensional barcode (100) around the cuboid object (305). To be specific, FIG. 3B shows a few of the bars (101) and spaces (102) wrapping behind the cuboid object (305) for simplicity in the diagram and in order to avoid confusion as to which bars (101) and/or spaces (102) lie where on the surface of the cuboid object (305). Thus, not all of the bars (101) and spaces (102) are shown wrapping around the cuboid object (305) but would be present if the cuboid object (305) could be physically turned around and observed.

Similar to above, the bars (101) and spaces (102) may all be parallel to a common plane such as the bottom of the cuboid object (305). In an example, the bars (101) and spaces (102) do not run parallel to any given common plane. In this example, the extended one-dimensional representation (110) of the one-dimensional barcode (100) may be wrapped around the cuboid object (305) without the ends of the extended one-dimensional representation (110) of the one-dimensional barcode (100) overlapping vertically on the cuboid object (305) shown in FIG. 3B. In the example shown in FIG. 3B, a first end of the extended one-dimensional representation (110) of the one-dimensional barcode (100) may be wrapped around the cuboid object (305) while a second end of the extended one-dimensional representation (110) of the one-dimensional barcode (100) may be placed above or below the first end with each end extending past each other. This is done so that the extended one-dimensional representation (110) of the one-dimensional barcode (100) may be scanned from any direction of the cuboid object (305) without a gap appearing between the first and second end.

Figure 4:
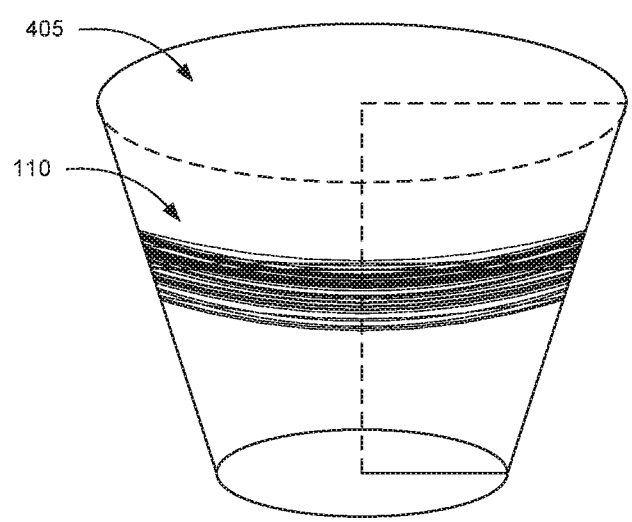
FIG. 4 is a bottom-up perspective view diagram showing an example of placement of the omnidirectional barcode of FIG. 1 according to an example of the principles described herein.

FIG. 4 is a bottom-up perspective diagram showing an example of placement of the omnidirectional barcode of FIG. 1 according to an example of the principles described herein. In this example, the extended one-dimensional representation (110) of the one-dimensional barcode (100) described herein has been wrapped around a right circular conical frustum object (405) such as a cup. In this example, the extended one-dimensional representation (110) of the one-dimensional barcode (100) has been distorted at printing such that when the extended one-dimensional representation (110) of the one-dimensional barcode (100) is applied to the exterior surface of the right circular conical frustum object (405), the bars (101) and spaces (102) in the representation of the barcode (100) on the surface of the cup are parallel with the bottom of the cup. In this case, the extended one-dimensional representation (110) of the one-dimensional barcode (100) is printed out in the form of a semicircle such that it may be applied to the outer surface of the right circular conical frustum object (405). In some examples, however, the extended one-dimensional representation (110) of the one-dimensional barcode (100) may be printed out in a straight manner such as that shown in FIGS. 1C and 3A. In this example, the ends of the printed extended one-dimensional representation (110) of the one-dimensional barcode (100) will not match up when wrapped around the surface of the right circular conical frustum object (405). However, the omnidirectional feature of the extended one-dimensional representation (110) of the one-dimensional barcode (100) may be maintained by overlapping the ends helically around the surface of the right circular conical frustum object (405).

The extended one-dimensional representation (110) of the one-dimensional barcode (100) described herein may be wrapped around any object such that a barcode scanner may successfully scan the extended one-dimensional representation (110) of the one-dimensional barcode (100). This may be especially true in an automated scanning situation of the object (115, 305, 405) where the object (115, 305, 405) may be scanned properly regardless of the direction the scanner is scanning the object (115, 305, 405) from.

The application of the extended one-dimensional representation (110) of the one-dimensional barcode (100) to the surface of an object (115, 305, 405) may also be accomplished using a three-dimensional (3D) printing device. In this example, the extended one-dimensional representation (110) of the one-dimensional barcode (100) may be rendered by the raster image processor of the 3D printing device along with the data used to render the 3D object (115, 305, 405). During printing, the surface of the 3D object (115, 305, 405) may be printed with the extended one-dimensional representation (110) of the one-dimensional barcode (100) and made viewable after the printing process. In the example of a 3D printing process, the colors of the bars (101) and spaces (102) included in the extended one-dimensional representation (110) of the one-dimensional barcode (100) may be colored as well as monochromatic as described above. In an example, the color of the bars (101) and spaces (102) may be altered by a user of the 3D printing device for aesthetic purposes of the printed 3D object (115, 305, 405) as well as readability of the extended one-dimensional representation (110) of the one-dimensional barcode (100).

Figure 5:
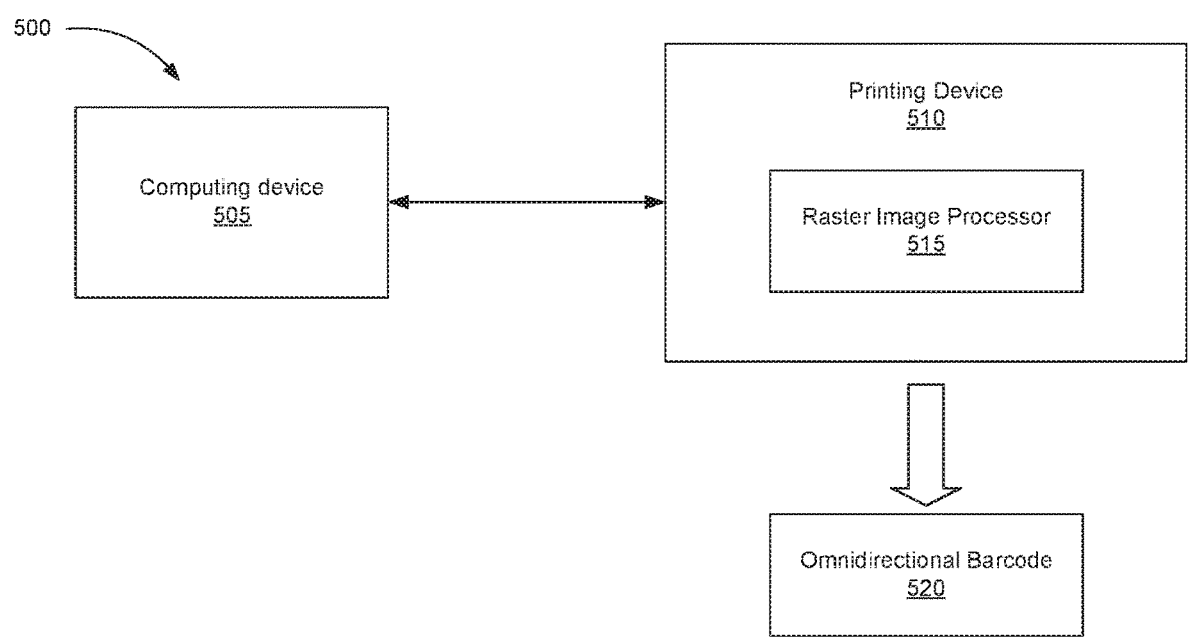
FIG. 5 is a block diagram showing a system for forming an omnidirectional barcode according to an example of the principles described herein.

FIG. 5 is a block diagram showing a system (500) for forming an omnidirectional barcode according to an example of the principles described herein. The system (500) may include a computing device (505) and a printing device (510) including a raster image processor (RAP) (515).

The computing device (505) may be any computing device capable of sending a printing request to a printing device (510). Examples of computing devices include servers, desktop computers, laptop computers, personal digital assistants (PDAs), mobile devices, smartphones, gaming systems, and tablets, among other computing devices.

The computing device (505) may be utilized in any data processing scenario including, stand-alone hardware, mobile applications, through a computing network, or combinations thereof. Further, the computing device (505) may be used in a computing network, a public cloud network, a private cloud network, a hybrid cloud network, other forms of networks, or combinations thereof. In one example, the methods provided by the computing device (505) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (505) are executed by a local administrator.

To achieve its desired functionality, the computing device (505) includes various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code, when executed by the processor, may cause the processor to implement at least the functionality of system (500), according to the methods of the present description presented herein. In the course of executing code, the processor may receive input from and provide output to a number of the remaining hardware units.

The data storage device may store data such as executable program code that is executed by the processor or other processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present description contemplates the use of many varying type(s) of memory in the data storage device as may suit a particular application of the principles described herein. In certain examples, different types of memory in the data storage device may be used for different data storage objectives. For example, in certain examples the processor may boot from Read Only Memory (ROM), maintain nonvolatile storage in the Hard Disk Drive (HDD) memory, and execute program code stored in Random Access Memory (RAM).

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device (505) enable the processor to interface with various other hardware elements, external and internal to the computing device (505). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the computing device (505) to interact with and implement the functionality of the computing device (505). The peripheral device adapters may also create an interface between the processor and the display device, the printing device (510), or other media output devices. The network adapter may provide an interface to other computing devices within, for example, a network, thereby enabling the transmission of data between the computing device (505) and other devices located within the network.

The computing device (505) may, when executed by the processor, display the number of graphical user interfaces (GUIs) on the display device associated with the executable program code representing the number of applications stored on the data storage device.

The computing device (505) may further include a number of modules used in the implementation of the system (500). The various modules within the computing device (505) include executable program code that may be executed separately. In this example, the various modules may be stored as separate computer program products. In another example, the various modules within the computing device (505) may be combined within a number of computer program products; each computer program product including a number of the modules. The computing device (505) may include these modules to, when executed by the processor, allow for the formation of an omnidirectional barcode as described herein.

The printing device (510) may be any printing device that applies a printing medium to a print media. In an example, the printing device (510) may be an inkjet printing device that uses a printing medium of, for example, ink to apply an image to a print media such as paper. In an example, the printing device (510) may be a 3D printing device that implements an additive or subtractive process to form a three-dimensional object on a surface. As described above, the printing device (510) may include a RAP (515) that receives image or object data from the computing device (505) and rasterize that data in preparation for printing. Along with the image or object data, the RAP (515) may also rasterize image or object data associated with the extended one-dimensional representation (110) of the one-dimensional barcode (100) described above. In the case of an inkjet printing device, the RAP (515) may print a copy of the extended one-dimensional representation (110) of the one-dimensional barcode (100) onto a piece of paper. In the case of the 3D printing device described herein, the RAP (515) may include the data associated with the extended one-dimensional representation (110) of the one-dimensional barcode (100) into the object data to be rasterized by applying the data describing the extended one-dimensional representation (110) of the one-dimensional barcode (100) as at least a portion of an outer surface of the object (115, 305, 405) to be printed. As a result of the printing process, the omnidirectional barcode described here is formed as output from the printing device (510).

Figure 6A:
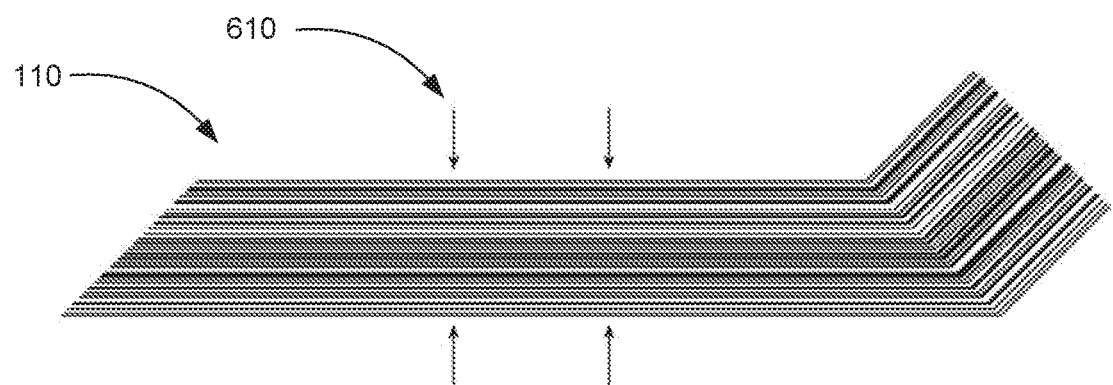
FIGS. 6A and 6B are diagrams showing an example of placement of the omnidirectional barcode of FIG. 1 according to an example of the principles described herein.
Figure 6B:
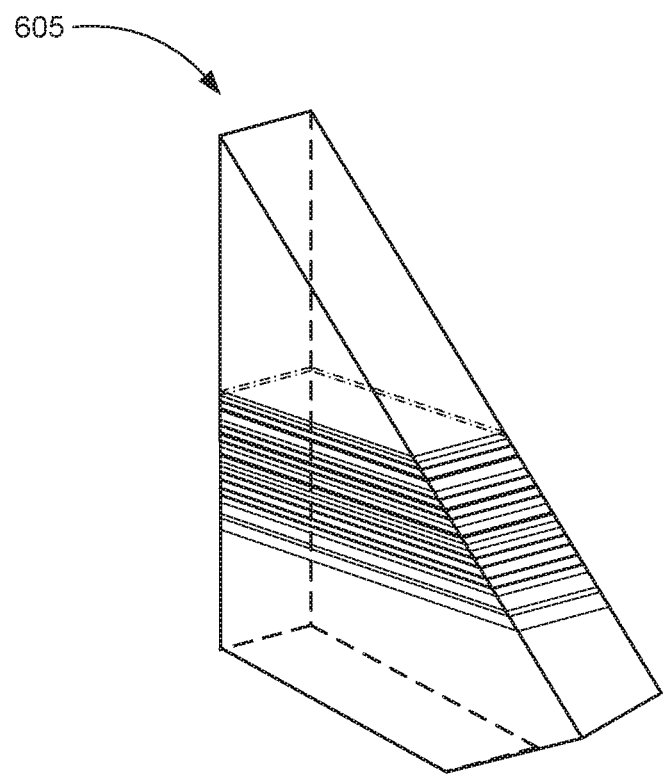

FIGS. 6A and 6B are diagrams showing an example of placement of the omnidirectional barcode of FIG. 1 according to an example of the principles described herein. In this example, the extended one-dimensional representation (110) of the one-dimensional barcode (100) described herein has been wrapped around a number of edges of a non-isotropic object (605). Similar to FIG. 3, there are a number of fold indicators (610) where the extended one-dimensional representation (110) of the one-dimensional barcode (100) is to be bent around corners (615) of the non-isotropic object (605). This may allow a user to better bend the extended one-dimensional representation (110) of the one-dimensional barcode (100) around the non-isotropic object (605). FIG. 6B shows this wrapping of the extended one-dimensional representation (110) of the one-dimensional barcode (100) around the non-isotropic object (605). To be specific, FIG. 6B shows a few of the bars (101) and spaces (102) wrapping behind the non-isotropic object (605) for simplicity in the diagram and in order to avoid confusion as to which bars (101) and/or spaces (102) lie where on the surface of the non-isotropic object (605). Thus, not all of the bars (101) and spaces (102) are shown wrapping around the non-isotropic object (605) but would be present if the non-isotropic object (605) could be physically turned around and observed.

Similar to above, the bars (101) and spaces (102) may all be parallel to a common plane such as the bottom of the non-isotropic object (605). In an example, the bars (101) and spaces (102) do not run parallel to any given common plane. In this example, the extended one-dimensional representation (110) of the one-dimensional barcode (100) may be wrapped around the non-isotropic object (605) without the ends of the extended one-dimensional representation (110) of the one-dimensional barcode (100) overlapping vertically on the non-isotropic object (605) shown in FIG. 6B. In the example shown in FIG. 6B, a first end of the extended one-dimensional representation (110) of the one-dimensional barcode (100) may be wrapped around the non-isotropic object (605) while a second end of the extended one-dimensional representation (110) of the one-dimensional barcode (100) may be aligned again with the first end such that the first and second ends of each line and space match up. This is done so that the extended one-dimensional representation (110) of the one-dimensional barcode (100) may be scanned from any direction of the non-isotropic object (605) without a gap appearing between the first and second end.

Examples provided herein include apparatuses, processes, and methods for generating three-dimensional objects. Apparatuses for generating three-dimensional objects may be referred to as additive manufacturing apparatuses. Example apparatuses described herein may correspond to three-dimensional printing systems, which may also be referred to as three-dimensional devices. In an example, additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where powder-based build material may include wet and/or dry powder-based materials, particulate materials, and/or granular materials. In some examples, the build material may be a weak light absorbing polymer. In some examples, the build material may be a thermoplastic. Furthermore, as described herein, agent may include fluids that may facilitate fusing of build material when energy is applied. In some examples, agent may be referred to as coalescing or fusing agent. In some examples, agent may be a light absorbing liquid, an infrared or near infrared absorbing liquid, such as a pigment colorant. In some examples, at least two types of agent may be selectively distributed on a build layer. In some examples, at least one agent may inhibit fusing of build material when energy is applied.

Example apparatuses may include an agent distributor. In some examples, an agent distributor may include at least one fluid ejection device. A fluid ejection device may include at least one printhead (e.g., a thermal ejection based printhead, a piezoelectric ejection based printhead, etc.). An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may include other types of fluid ejection devices that selectively eject small volumes of fluid.

In some examples, an agent distributor may include at least one fluid ejection device that includes a plurality of fluid ejection dies arranged generally end-to-end along a width of the agent distributor. In some examples, the at least one fluid ejection device may include a plurality of printheads arranged generally end-to-end along a width of the agent distributor. In such examples, a width of the agent distributor may correspond to a dimension of a build area. For example, a width of the agent distributor may correspond to a width of a build area. An agent distributor may selectively distribute agent on a build layer in the build area concurrent with movement of the scanning carriage over the build area. In some example apparatuses, the agent distributor may include nozzles including nozzle orifices through which agent may be selectively ejected. In such examples, the agent distributor may include a nozzle surface in which a plurality of nozzle orifices may be formed.

In some examples, apparatuses may include a build material distributor to distribute build material in the build area. A build material distributor may include, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor of the computing device (505) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an omnidirectional barcode and a method of forming an omnidirectional barcode. The omnidirectional barcode described herein allows for an object that can be scanned from any direction. This allows for relatively easier scanning of the object especially where an automated scanning system is implemented.

The preceding description has been presented to illustrate and describe examples of the principles described. This description is not intended to be exhaustive or to limit these principles to any precise form disclosed. Many modifications and variations are possible in light of the above teaching.

What is claimed is:

1. An omnidirectional barcode, comprising:
a graphical representation of a one-dimensional barcode, the graphical representation comprising parallel lines that are extended from a cross-section of the one-dimensional barcode;
wherein the graphical representation of the one-dimensional barcode comprises two sections of parallel lines in which a first section is printed at a non-zero angle with respect to a second section, a junction between the first and second sections corresponding to a corner around which the omnidirectional barcode is to be placed on a three-dimensional (3D) object.

2. The omnidirectional barcode of claim 1, wherein the graphical representation of the one-dimensional barcode comprises fold indicators along the first second section of indicate where the omnidirectional barcode is to fold around additional corners of the 3D object.

3. The omnidirectional barcode of claim 1, wherein ends of the graphical representation of the one-dimensional barcode align with each other.

4. The omnidirectional barcode of claim 1, wherein ends of the graphical representation of the one-dimensional barcode do not align with each other.

5. The omnidirectional barcode of claim 1, wherein the omnidirectional barcode comprises black and white stripes.

6. The omnidirectional barcode of claim 1, wherein the omnidirectional barcode comprises differently colored stripes.

7. The omnidirectional barcode of claim 1, wherein the graphical representation of the one-dimensional barcode is non-uniform in at least one of the dimensions of the extension.

8. The omnidirectional barcode of claim 1, wherein:
the one-dimensional barcode comprises vector image drawing instructions; and
the graphical representation of the one-dimensional barcode comprises a modification of the vector image drawing instructions to cover a two-dimensional region.

9. The omnidirectional barcode of claim 1, wherein the cross-section is a single pixel wide when taken from the one-dimensional barcode.

10. A method of forming an omnidirectional barcode, comprising:
creating a graphical representation of a one-dimensional barcode comprising vector image drawing instructions; and
modifying the vector image drawing instructions to form the omnidirectional barcode by extending the graphical representation over a two-dimensional region.

11. The method of claim 10, further comprising wrapping the omnidirectional barcode around the circumference of a three-dimensional (3D) object.

12. The method of claim 10, further comprising printing the omnidirectional barcode around the circumference of a three-dimensional (3D) object using a 3D printing device.

13. The method of claim 12, wherein the omnidirectional barcode is printed on the 3D object using a colored printing material.

14. The method of claim 10, wherein the omnidirectional barcode comprises two sections of parallel lines in which a first section is printed at a non-zero angle with respect to a second section, a junction between the first and second sections corresponding to a corner around which the omnidirectional barcode is to be placed on a three-dimensional (3D) object.

15. The method of claim 10, further comprising printing fold indicators along the omnidirectional barcode indicating corners around which the omnidirectional barcode is to fold on a three-dimensional object.

16. An object, comprising:
an omnidirectional barcode; comprising:
a graphical representation of a one-dimensional barcode comprising a single pixel-wide cross section of the one-dimensional barcode;
wherein the graphical representation of the one-dimensional barcode is extended circumferentially around a three-dimensional (3D) object; and
fold indicators along the omnidirectional barcode indicating corners of the 3D object around which the omnidirectional barcode folds.

17. The object of claim 16, wherein the object is printed using a 3D printing device with the omnidirectional barcode printed on the object during a 3D printing process.

18. The object of claim 16, wherein the omnidirectional barcode extends circumferentially around the 3D object and not parallel to a common plane.

19. The object of claim 16, wherein the omnidirectional barcode is printed using more than two colors.

* * * * *